United States Patent
Safavi et al.

(10) Patent No.: US 10,411,754 B2
(45) Date of Patent: Sep. 10, 2019

(54) APPARATUS AND METHOD FOR NON-ORTHOGONAL TRANSMISSIONS

(71) Applicant: HUAWEI TECHNOLOGIES CO., LTD., Shenzhen, Guangdong (CN)

(72) Inventors: Anahid Robert Safavi, Kista (SE); Alberto Giuseppe Perotti, Segrate (IT); Branislav M. Popovic, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/858,756

(22) Filed: Dec. 29, 2017

(65) Prior Publication Data
US 2018/0123636 A1 May 3, 2018

Related U.S. Application Data

(63) Continuation of application No. PCT/EP2015/065038, filed on Jul. 1, 2015.

(51) Int. Cl.
*H04B 1/707* (2011.01)
*H04J 13/00* (2011.01)

(52) U.S. Cl.
CPC .......... *H04B 1/707* (2013.01); *H04J 13/0007* (2013.01)

(58) Field of Classification Search
CPC ............................. H04B 1/707; H04J 13/0007
See application file for complete search history.

(56) References Cited

U.S. PATENT DOCUMENTS

| 7,669,109 B2* | 2/2010 | Hocevar | H03M 13/1114 714/780 |
| 2009/0106625 A1* | 4/2009 | Jun | G11B 20/18 714/758 |
| 2010/0077275 A1* | 3/2010 | Yu | H03M 13/114 714/752 |
| 2012/0221915 A1 | 8/2012 | Eroz et al. | |

(Continued)

FOREIGN PATENT DOCUMENTS

| WO | 01/97387 A1 | 12/2001 |
| WO | 2014075637 A1 | 5/2014 |
| WO | 2014/144758 A1 | 9/2014 |

OTHER PUBLICATIONS

Takeuchi, Keigo et al., "Performance improvement of iterative multiuser detection for large sparsely spread CDMA systems by spatial coupling", IEEE Transactions on Information Theory 61(4):1768-94, Apr. 1, 2015, XP011575461, 27 pages.

(Continued)

*Primary Examiner* — Freshteh N Aghdam
(74) *Attorney, Agent, or Firm* — Huawei Technologies Co., Ltd.

(57) ABSTRACT

A transmitter apparatus in a wireless communication system that includes a processor. In one embodiment, the processor is configured to receive at least one modulated data message and spread the at least one modulated data message into a transmission signal using a low density signature matrix. The low density signature matrix is a cycle-free signature matrix. A receiver apparatus is configured to receive the transmission signal and detect within the received transmission signal at least one modulated data message. The processor is configured to detect the at least one modulated data message in one iteration using the cycle-free signature matrix.

15 Claims, 13 Drawing Sheets

(56) References Cited

U.S. PATENT DOCUMENTS

| | | | | |
|---|---|---|---|---|
| 2013/0198581 | A1* | 8/2013 | Lee | H03M 13/1117 |
| | | | | 714/752 |
| 2016/0112158 | A1* | 4/2016 | Popovic | H03M 13/2707 |
| | | | | 370/330 |
| 2016/0150544 | A1* | 5/2016 | Nikopour | H04B 17/336 |
| | | | | 370/329 |
| 2016/0261288 | A1* | 9/2016 | Shinohara | H03M 13/1165 |
| 2018/0287638 | A1* | 10/2018 | Ikegaya | H04L 1/0057 |

OTHER PUBLICATIONS

Sedaghat, Mohammad Ali et al., "Belief propagation-based multiuser receivers in optical code-division multiple access systems", IET Commun. 7(18):2102-12, Dec. 17, 2013, XP006047210, 11 pages.

Hoshyar, R. et al., "Novel low-density signature for synchronous CDMA systems over AWGN channel", IEEE Transactions on Signal Processing 56(4):1616-26, Apr. 1, 2008, XP011205892, 11 pages.

Massimo Rovini et al., "A scalable decoder architecture for IEEE 802.11n LDPC codes", Global Telecommunications Conference, 2007, GLOBECOM 07, IEEE, IEEE, Piscataway, NJ, USA, Nov. 1, 2007, XP031196548, 5 pages.

J. van de Beek and B. Popovic, "Multiple access with low-density signatures," Proceedings of IEEE Global Telecomm. Conf. GLOBECOM 2009, Honolulu, HI, Nov. 30-Dec. 4, 2009, pp. 1-6, 6 pages.

3GPP TS 36.212 V10.2.0 3rd Generation Partnership Project; Technical Specification Group Radio Access Network; Evolved Universal Terrestrial Radio Access (E-UTRA); Multiplexing and channel coding (Release 10), Technical Specification, Jun. 2011, 78 pages.

* cited by examiner

APPARATUS AND METHOD FOR NON-ORTHOGONAL TRANSMISSIONS

CROSS-REFERENCE TO RELATED APPLICATIONS

This application is a continuation of International Application No. PCT/EP2015/065038, filed on Jul. 1, 2015, the disclosure of which is hereby incorporated by reference in its entirety.

TECHNICAL FIELD

The aspects of the present disclosure relate generally to wireless communication systems and in particular to non-orthogonal transmissions between base stations and wireless user equipment.

BACKGROUND

One of the major challenges for the next generation of wireless communication systems is considerable traffic-growth. Current systems such as Long Term Evolution (LTE) already provide very high peak data rates per user both in the uplink and the downlink. Therefore, it seems reasonable to consider that such a predicted traffic growth accounts for higher aggregate data rate, i.e. higher spectral efficiency for many simultaneous users, rather than increasing the per-user spectral efficiency.

Code division multiple access (CDMA) is one of the most spectrally efficient schemes when considering several users. In CDMA type systems, several code-words related to different users are transmitted concurrently over the same resource (i.e. summed) after being assigned a user-specific signature and spreading. Generally, in a generic CDMA transmission, the number of signature sequences is equal to the number of chips.

An overloaded situation is where there are more signature sequences than chips. In this case, a set of orthogonal signatures does not exist and interference in the transmitter is inherent. Using more signatures than available chips permits scheduling more users compared to orthogonal transmission and fulfills the massive connectivity requirement necessary for the next generation of communication systems.

When it comes to detection, the optimum Maximum A Posteriori (MAP) multi user detection can be done by using an algorithm which performs an exhaustive search over a large set of possible transmitted signals. Such a demodulator is typically too complex for practical use, as it has to go through all possible sequences of $x \in \mathbb{X}^K$. In other words, this demodulator evaluates $|\mathbb{X}^K|$ signal alternatives to find the solution for each chip. Therefore, the total number of alternatives (or metrics) for complete demodulations are $N|\mathbb{X}|^K$. However, it has been demonstrated that the complexity of the MAP demodulator could be reduced by using specially designed sparse signatures which allow to employ simpler receiver algorithms.

Such sparse signatures contain only few non-zero elements and are referred to as Low-Density Spreading (LDS) signatures or low density signature matrices. So far, Low Density Parity Check (LDPC) code matrices were used as LDS signature matrices. The constraints applied in the generation of LDPC matrices imply that the corresponding graph representation contains cycles. This characteristic is key for enabling the use of iterative decoding algorithms at the receiver.

In the design of signatures so far it was anticipated that matrices designed according to the conventional LDPC structure will perform adequately. These matrices are low density as previously discussed and have cycles in their graph representation.

Results obtained show that the LDS iterative detector tailored to signatures of the LDPC type can achieve a robust near single-user performance with overloading factors of up to 2 when using Binary Phase Shift Keying (BPSK). Using more complex modulations, such as Quadrature Phase Shift Keying (QPSK), the aforementioned detector approaches the single-user performance with a larger gap for overloading factors up to or more than 2.

It would be advantageous to provide single-user performance with a smaller gap for overloading namely when QPSK and overloading factors higher than 2 are used. It would also be advantageous to increase the aggregate spectral efficiency in multiple access transmission schemes of LDS type while reducing receiver complexity. Furthermore, it would be advantageous to jointly optimize the LDS signature and LDS transceiver to provide reasonable performance even when higher overloading factors are employed.

SUMMARY

It is an object of the present disclosure to provide apparatus and methods to increase the aggregate spectral efficiency in multiple access transmission schemes of LDS type while reducing receiver complexity. This object is solved by the subject matter of the independent claims. Further advantageous modifications can be found in the dependent claims.

According to a first aspect of the present disclosure the above and further objects and advantages are obtained by a transmitter apparatus for a wireless communication system that includes a processor. In one embodiment, the processor is configured to receive at least one modulated data message and spread the at least one modulated data message into a transmission signal using a low density signature matrix, wherein the low density signature matrix is a cycle-free signature matrix.

In a first possible implementation form of the transmitter apparatus according to the first aspect the transmitter apparatus is configured to transmit the transmission signal over a radio channel of the wireless communication system. The aspects of the disclosed embodiments provide higher spectral efficiency for many simultaneous users. Code-words related to different users are transmitted concurrently over the same resource after being assigned a user-specific signature and spreading. This reduces receiver complexity and improves system performance.

In a second possible implementation form of the transmitter apparatus according to the first aspect as such, the processor is configured to spread the at least one modulated data message with at least one other modulated data message. The aspects of the disclosed embodiments provide for spreading the at least one modulated data message with at least one other modulated data message to form the transmission signal, where any number of data messages can be spread using the cycle-free signature matrix.

In a third possible implementation form of the transmitter apparatus according to the first aspect, or any of the preceding possible implementation forms as such, the cycle-free signature matrix is a concatenation of phase-rotating identity matrices and all-zero matrices. The aspects of the disclosed embodiments provide a simple and flexible design that facilitates adaptation of the transmission system to varying channel conditions and provides a detector with less complexity. Detection is performed within one iteration using a non-iterative belief propagation algorithm. This provides better system performance.

In a first possible implementation form of the third possible implementation form of the transmitter apparatus according to the first aspect as such, the phase-rotating identity matrices maximize a minimum Euclidean distance between symbols of a chip constellation. Maximizing a minimum Euclidean distance between symbols of a chip constellation will provide better performance for the overall system.

In a second possible implementation form of the third possible implementation form of the transmitter apparatus according to the first aspect as such, the phase-rotating identity matrices include uniformly spaced phases in a given interval [0,kπ], where kπ is a phase rotation that, when applied to a signal constellation, transforms the signal constellation into itself. Uniformly spaced phases will provide better performance for the system.

In a fourth possible implementation form of the transmitter apparatus according to the first aspect as such, or any of the preceding possible implementation forms, the processor is configured to encode, interleave and modulate the at least one modulated data message and the at least one other modulated data message. The aspects of the disclosed embodiments provide for any number of data messages to be spread using the cycle-free signature matrix.

In a fifth possible implementation form of the transmitter apparatus according to the first aspect as such, or any of the preceding possible implementation forms, the processor is configured to spread and transmit modulation symbols for the at least one modulated data message using the cycle-free signature matrix. The aspects of the disclosed embodiments provide for any number of streams of data to be overloaded.

In a sixth possible implementation form of the transmitter apparatus according to the first aspect as such, or any of the previous implementation forms, a modulation used to modulate the at least one modulated data message is Quadrature Amplitude Modulation (QAM). QAM is a widely employed type of digital modulation.

In a seventh possible implementation form of the transmitter apparatus according to the first aspect as such, or any of the previous implementation forms, the processor is configured to compute the cycle-free signature matrix based on an overloading factor greater than one. Computing the cycle-free signature matrix in this manner results in a simple and flexible spreading matrix design that facilitates adaptation of the transmission system to varying channel conditions. The detector will have less complexity as detection is performed within one iteration using a non-iterative belief propagation algorithm.

In a first possible implementation form of the seventh possible implementation form of the transmitter apparatus according to the first aspect as such, the processor is configured to spread and transmit modulation symbols for the at least one modulated data message using the computed cycle-free signature matrix. Spreading and transmitting modulation symbols for the at least one modulated data message using the computed cycle-free signature matrix can improve the performance of the system.

According to a second aspect of the present disclosure the above and further objects and advantages are obtained by a receiver apparatus for a wireless communication system that includes a processor. In one embodiment, the receiver apparatus is configured to receive a transmission signal and detect within the received transmission signal at least one modulated data message in one iteration using a cycle-free signature matrix. The use of a cycle-free signature matrix reduces the complexity of the receiver.

In a first possible implementation form of the receiver apparatus according to the second aspect as such, the processor is configured to compute, in one iteration, soft information related to received code bits of the received transmission signal and de-interleave the soft information. Being able to compute the soft information in one iteration reduces the complexity of the receiver and improves system performance. It is not necessary to compute the transmitted message from variable node to function node. After one iteration, the exact variable soft node values are obtained and the MPA detector will give the exact MAP detection of the transmitted symbol.

In a second possible implementation form of the receiver apparatus according to the second aspect as such, or to any of the preceding possible implementation forms, the processor is configured to detect and decode the received transmission signal in a sequential manner using de-interleaving and de-rate matching. The aspects of the disclosed embodiments reduce the receiver complexity, which improves system performance.

In a third possible implementation form of the receiver apparatus according to the second aspect as such, or as to any of the preceding possible implementation forms of the second aspect, the processor is configured to jointly detect and decode the received transmission signal through iterations including de-interleaving, de-rate matching, interleaving, and rate matching. The aspects of the disclosed embodiments reduce the receiver complexity, which improves system performance.

According to a third aspect of the present disclosure the above and further objects and advantages are obtained by a radio access network. In one embodiment, the radio access network comprises a transmitter apparatus and a receiver apparatus according to any one of the preceding possible implementation forms of the first aspect and the second aspect. The aspects of the disclosed embodiments increase the aggregate spectral efficiency in multiple access transmission schemes of an LDS type, while reducing receiver complexity. This improves system performance where any number of data streams can be overloaded.

According to a fourth aspect of the present disclosure the above and further objects and advantages are obtained by a method for non-orthogonal transmission in a wireless communication system. In one embodiment, the method includes selecting at least one data message for transmission, encoding and modulating the at least one data message, interleaving the encoded and modulated at least one data message; and spreading the encoded, modulated and interleaved at least one data message into a transmission signal using a cycle-free signature matrix. The aspects of the disclosed embodiments increase the aggregate spectral efficiency in multiple access transmission schemes of an LDS type, while reducing receiver complexity. This improves system performance where any number of data streams can be overloaded.

In a first implementation form of the fourth aspect, the method includes transmitting the transmission signal over a radio channel of the wireless communication system. The aspects of the disclosed embodiments provide higher spectral efficiency for many simultaneous users. Code-words related to different users are transmitted concurrently over the same resource after being assigned a user-specific signature and spreading. This reduces receiver complexity and improves system performance.

In a second implementation form of the fourth aspect as such or any of the preceding possible implementation forms, the method includes receiving the transmission signal, and detecting within the received transmission signal at least one modulated data message in one iteration using a cycle-free signature matrix. This reduces receiver complexity and improves system performance.

According to a fifth aspect of the present disclosure the above and further objects and advantages are obtained by a method for non-orthogonal reception in a wireless communication system. In one embodiment, the method includes receiving a signal and detecting, in one iteration using a cycle-free signature matrix, at least one modulated data message in the received signal. The aspects of the disclosed embodiments increase the aggregate spectral efficiency in multiple access transmission schemes of an LDS type, while reducing receiver complexity. This improves system performance where any number of data streams can be overloaded.

According to a sixth aspect of the present disclosure the above and further objects and advantages are obtained by a computer program product comprising non-transitory computer program instructions that when executed by a processor causes the processor to perform the method according to one or more of the fourth aspect and the fifth aspect.

According to a seventh aspect of the present disclosure the above and further objects and advantages are obtained by an apparatus for a wireless communication network. In one embodiment, the apparatus includes a transmitter configured to transmit a transmission signal over a radio channel of a wireless communication network, the transmission signal being formed by receiving at least one modulated data message, and spreading the at least one modulated data message into a transmission signal using a low density signature matrix, wherein the low density signature matrix is a cycle-free signature matrix, and a receiver configured to receive the transmission signal, and detect, within the received transmission signal at least one modulated data message in one iteration using the cycle-free signature matrix. The aspects of the disclosed embodiments increase the aggregate spectral efficiency in multiple access transmission schemes of an LDS type, while reducing receiver complexity. This improves system performance where any number of data streams can be overloaded.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed disclosure, for which reference should be made to the appended claims. Additional aspects and advantages of the disclosure will be set forth in the description that follows, and in part will be obvious from the description, or may be learned by practice of the disclosure. Moreover, the aspects and advantages of the disclosure may be realized and obtained by means of the instrumentalities and combinations particularly pointed out in the appended claims.

BRIEF DESCRIPTION OF THE DRAWINGS

In the following detailed portion of the present disclosure, the disclosure will be explained in more detail with reference to the example embodiments shown in the drawings, in which.

DETAILED DESCRIPTION OF THE DISCLOSED EMBODIMENTS

Figure 1:
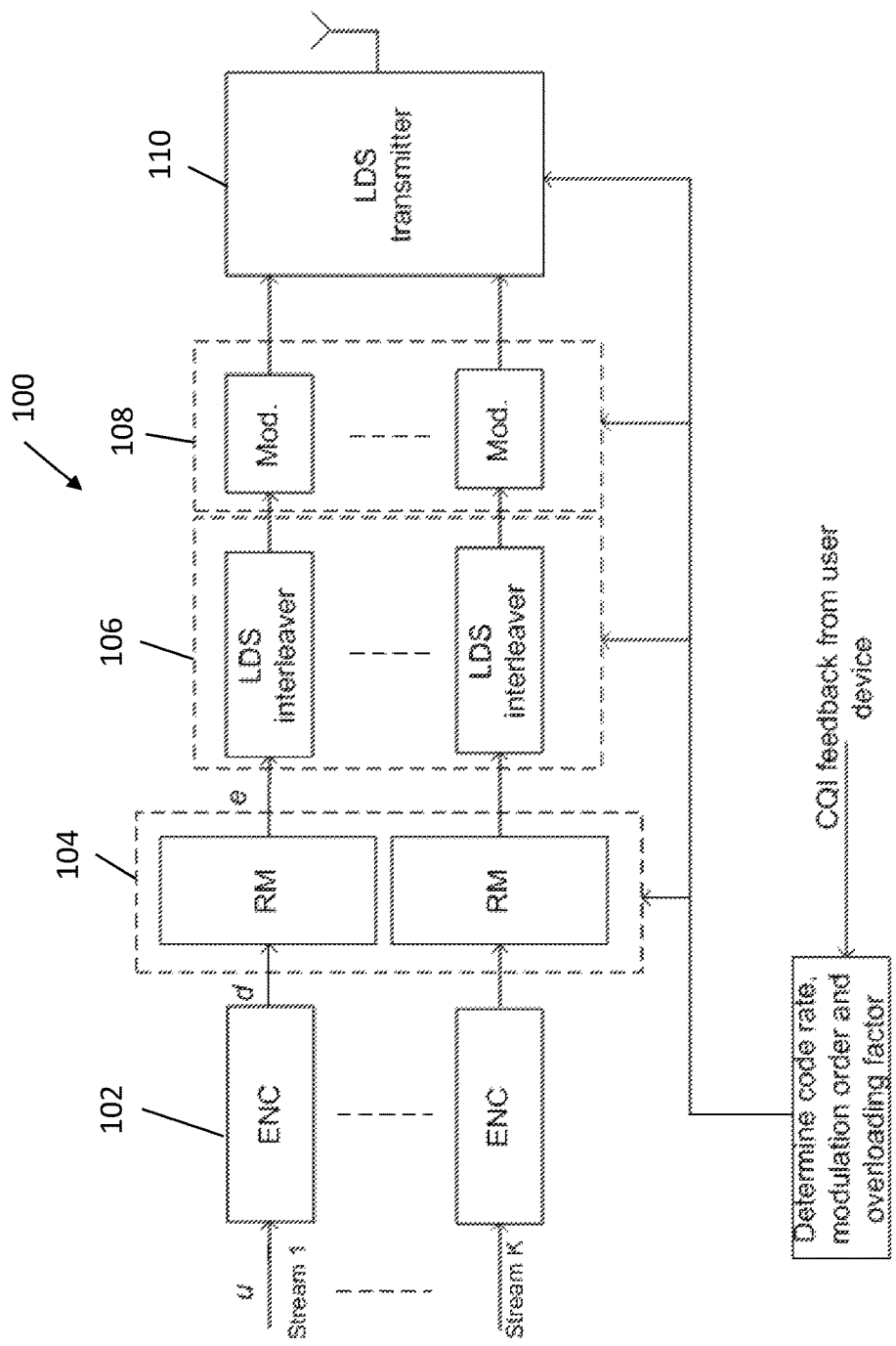
FIG. 1 illustrates a block diagram of a transmitter apparatus incorporating aspects of the disclosed embodiments.

Referring to FIG. 1, a block diagram of an exemplary transmitter apparatus 100 including aspects of the disclosed embodiments is illustrated. The aspects of the disclosed embodiments are directed to increasing the aggregate spectral efficiency in multiple access transmission schemes of an LDS type, while reducing receiver complexity.

Referring to FIG. 1, in the transmitter apparatus 100, K streams of information bits u are encoded using different Forward Error Correction (FEC) encoders 102. Coded bits d corresponding to the different stream K are rate matched in corresponding rate matching devices 104. The rate matched bits e are interleaved independently in one of the interleavers 106 and then mapped to modulated symbols or modulated data messages in a modulator 108. The modulated data messages are then fed into the LDS transmitter 110 to be spread using an LDS spreading matrix that has no cycles or is cycle-free, referred to herein as a cycle-free signature matrix. As is illustrated in the exemplary block diagram of FIG. 1, any number of streams K of data can be overloaded without loss of generality, meaning that the number of streams K could be one or more (p to K being 1, 2, 3, . . . , K). In the case of only one stream, only one forward correction encoder 102 is used to encode information bits, and one rate matching device 104 and one interleaver unit 106 is used prior to spreading using the LDS spreading matrix of the LDS transmitter 110.

Figure 2:
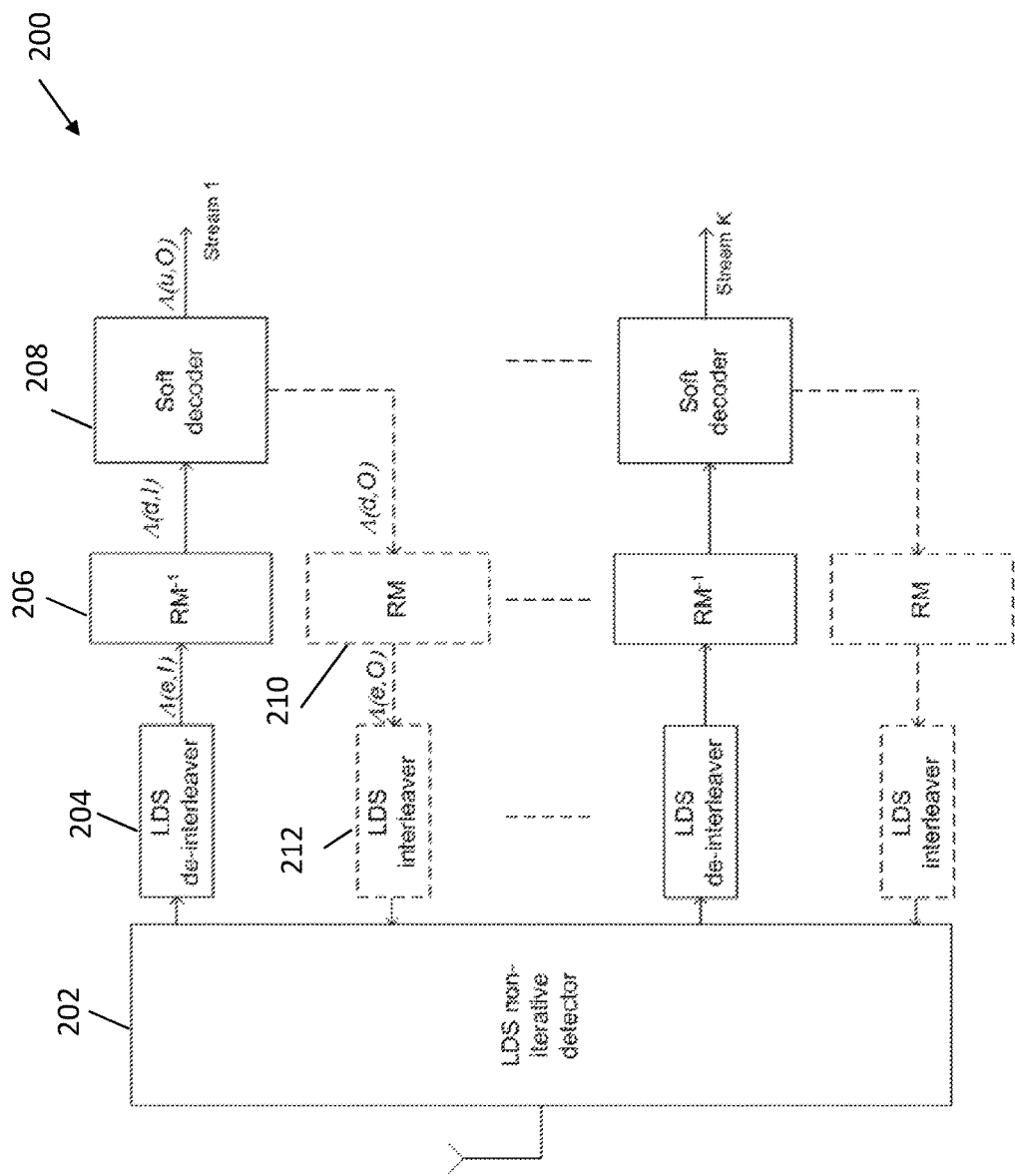
FIG. 2 illustrates a block diagram of a receiver apparatus incorporating aspects of the disclosed embodiments.

FIG. 2 illustrates an exemplary LDS receiver apparatus 200 incorporating aspects of the disclosed embodiments. In this example, the LDS receiver apparatus 200 is illustrated implemented in different ways. One way is to serially concatenate the LDS detector 202 with the Soft-Input Soft-Output (SISO) decoder 208 through the LDS de-interleaver 204 and inverse rate matching ($RM^{-1}$) blocks 206. The SISO decoder 208 applies the convolutional code constraints to its input soft information and delivers its output soft information related to information bits and to coded bits. This process is represented by the solid line portion of FIG. 2.

Referring also to FIG. 2, in one embodiment, another way to implement the receiver apparatus 200 is to jointly detect and decode the received signal according to an iterative approach. This is illustrated by the dashed line portion of FIG. 2. In this example, the resulting iterative receiver algorithm repeatedly executes the LDS detector 202 and the SISO decoder 208, exchanging soft information through the inverse rate matching (RM$^{-1}$) devices 206, rate matching device (RM) 210 and LDS de-interleaver blocks 204 and LDS interleaver block 212.

The LDS detector 202 of FIG. 2 computes soft information related to coded bits using only one iteration. The soft information is de-interleaved using the LDS de-interleaver 204. The resulting soft information is indicated as Λ(e; I) in FIG. 2.

The SISO decoder 208 applies the convolutional code constraints to its input soft information and delivers in output, soft information Λ(u; O) related to information bits. Moreover, the SISO decoder 208 computes updated soft information Λ(e; O) related to coded bits and feeds the updated soft information back to the LDS detector 202 through the LDS interleaver block 212.

The block diagram of FIG. 2 illustrates the case where any number of data streams can be detected and decoded without loss of generality. In this case, the LDS non iterative detector 202 outputs soft information Λ(e; I) related to each encoded stream and decoding is performed over each stream using serially concatenated detector 202 and soft decoder 208 or by jointly decoding and detecting the received signal corresponding to an iterative approach, as shown by the dashed lines.

The aspects of the disclosed embodiments are directed providing higher spectral efficiency for many simultaneous users. As noted above, CDMA system code-words related to different users are transmitted concurrently over the same resource after being assigned a user-specific signature and spreading. In a generic CDMA system, the number of signature sequences is equal to the number of chips.

In particular, the aspects of the disclosed embodiments are directed to the overloaded case, where there are more signature sequences than chips. In this case, a set of orthogonal signatures does not exist and interference in the transmitter is inherent. Using more signatures than available chips permits scheduling more users as compared to orthogonal transmission and therefore fulfills the massive connectivity requirement necessary for the next generation of communication systems.

As an example, the received vector y consisting of N received chip values can be modeled as:

$$y = Sx + z$$

where S is the N×K complex signature matrix (each signature being a column of the matrix), $x \in \mathbb{X}^K$ is the column vector containing the modulation symbols each belonging to a set of complex values $\mathbb{X}$ called signal constellations. Finally, z is the column vector containing complex-valued independent samples of additive white Gaussian noise with variance $\sigma_z^2$. Symbols of vector y are usually called chips and their values belong to a set of chip constellations wherein $y \in \mathbb{Y}^N$. Each element of vector y belongs to a set of complex values $\mathbb{Y}$ hereinafter called a chip constellation, where $\mathbb{Y}^N$ is a N dimensional space with N coordinates. The operation of multiplexing the modulation symbols of the same or different users using complex signatures is called spreading. After spreading, modulation symbols are transmitted over the channel. The ratio of $$\frac{K}{N},$$

i.e. the number of signature sequences to the number of resulted chips, is defined as the overloading factor.

As noted above, optimum Maximum A Posteriori (MAP) multi user detection can be done by using an algorithm which performs an exhaustive search over a large set of possible transmitted signals. However, such a demodulator is typically too complex for practical use, as it has to go through all possible sequences of $x \in \mathbb{X}^K$. It has been demonstrated that the complexity of the MAP demodulator could be reduced by using specially designed sparse signatures, which allow employing simpler receiver algorithms.

Such sparse signatures contain only few non-zero elements and are referred to as Low-Density Spreading (LDS) signatures and LDPC matrices are used as LDS signature matrices. The constraints applied in the generation of LDPC matrices imply that the corresponding graph representation contains cycles. This is characteristic for enabling the use of iterative decoding algorithms at the receiver.

According to the aspect of the disclosed embodiments, with the use of the LDS signature structure described herein, the MAP detection problem can be translated into a sub-optimum iterative SISO (Soft-Input Soft-Output) multiuser detection that is based on the Message Passing Algorithm (MPA) or belief propagation (BP) method, which exploits the LDS signature structure of the disclosed embodiments efficiently. The LDS signature structure of the disclosed embodiments will iteratively approximate the global optimum MAP detection by factorizing it into the product of simple local channel observations and then combining it at a later stage.

The LDS signature structure of the disclosed embodiments is sparse, and computation of the aforementioned local observations and corresponding combination has considerably lower complexity compared to an exhaustive search. Thus, the detection algorithm according to the disclosed embodiments has a lower complexity.

A LDS signature of length N is a sequence of N spreading symbols (chips) such that $w_c$ chips in each column are not equal to zero, while $N-w_c$ are equal to zero, where $w_c \ll N$. There is also a number of $w_r$ non-zero elements in each row of the signature matrix in a way that $w_r \ll K$. These properties characterize the class of regular signature matrices.

For an LDS detector of the prior art, the received vector of chip n can be written as in the following:

$$y_n = s^{[n]} x^{[n]} + z_n$$

where $s^{[n]}$ denotes the row vector containing the $n^{th}$ row of matrix S and $x^{[n]}$ is the column vector of corresponding input modulation symbols that contribute to the $n^{th}$ received chip, defined as $$\begin{cases} x_i^{[n]} = x_i, & \text{if symbol } i \text{ contributes to chip } n \\ x_i^{[n]} = 0, & \text{otherwise} \end{cases}$$

Here, $x_i^{[n]}$ indicates the $i^{th}$ element of vector $x^{[n]}$.

Figure 3:
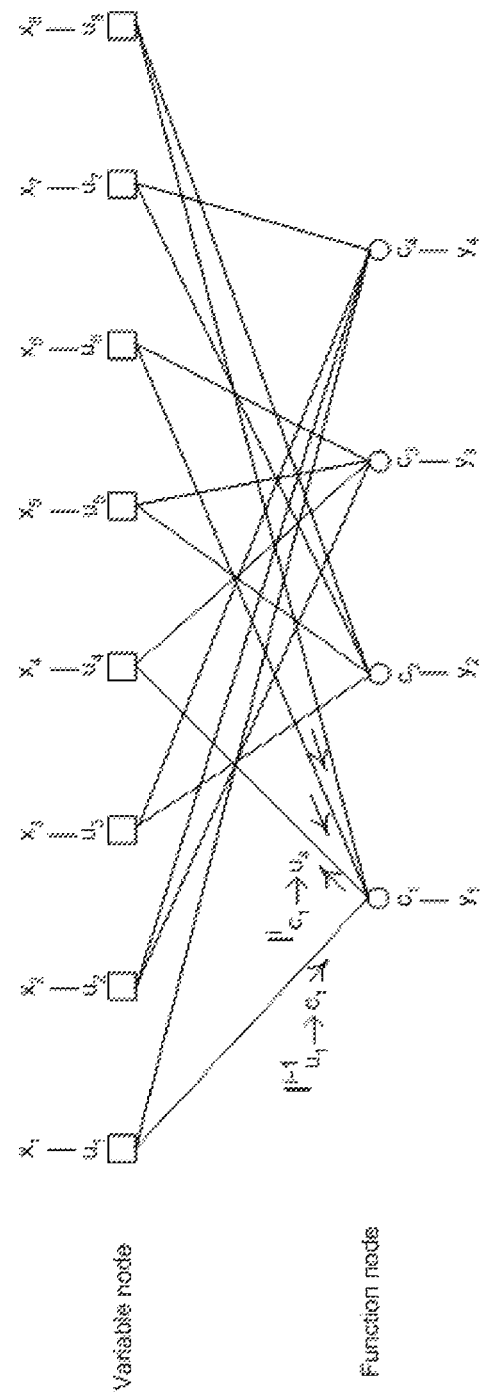
FIG. 3 illustrates a factor graph presentation for a prior art LDS scheme.

The class of sub-optimum multi-user detectors proposed so far for LDS could be represented by its corresponding factor graph. Referring to FIG. 3 for example, in the factor graph representation shown, the transmitted symbols $x_k$, k=1, . . . , K and the chip observations $y_n$, n=1, . . . , N are denoted as variable nodes and function nodes respectively. Let the edge $e_{k,n}$ be the edge that connects a function node $c_n$ to a variable node $u_k$. In the corresponding system model, the edge $e_{k,n}$ exists if there is a non-zero element in matrix S corresponding to chip n and input symbol k. Otherwise, there is no edge in the factor graph presentation. A signature matrix S has cycles when there is a path on the edges that starts from one node and ends up to the same node.

Consequently, in the LDS structure of the prior art with reference to the graph of FIG. 3, each variable node $u_k$ is connected to only $w_c$ function nodes $c_n$, $\forall n \in V(n)$ and each function node $c_n$ is connected to only $w_r$ variable nodes $u_k$, $\forall k \in Z(k)$. V(n) is the set of variable nodes that are connected to the function node n and Z(k) is the set of function nodes that are connected to the variable node k. The factor graph representation shown in FIG. 3 is of a LDS signature matrix of size 4×8.

Referring to the example of FIG. 3 where the LDS structure contains cycles, it has been previously shown that optimum MAP detection could be approximated by using the underlying factor graph presentation and applying an iterative message passing algorithm. In the example of FIG. 3, the messages are exchanged between function and variable nodes along the respective edges and iteratively updated. The content of those messages are soft values indicating the reliability of the corresponding symbol associated to each edge. For BPSK modulation, the log likelihood ratio (LLR) of the symbol can be used to represent the message. For the case of higher order modulation, the exchanged message is a vector containing reliability of each possible symbol of the symbol constellation.

With respect to the example of FIG. 3, the message passing algorithm works as follows. The message sent out from function node $c_n$ on the edge $e_{k,n}$ is the product of the messages received during the previous iteration from edges $e_{n,m}$, $\forall m \in V(n) \backslash k$ with the local channel observation made on chip $c_n$. The notation V(n)\k denotes the set containing all variable nodes connected to function node n except the variable node. Similarly the variable node $u_k$ will send on edge $e_{n,k}$ a message, which is the product of the messages received from edges $e_{m,k}$, $\forall m \in Z(k) \backslash n$. These operations are repeated for a number of iterations. When the maximum number of iterations is reached, each variable node will use all the incoming messages to calculate the estimated symbol.

The aforementioned iterations in the message passing algorithm could be summarized in the following equations:

Equation 1: Computation of outgoing message from function node to variable node $$I^{(i)}_{c_n \to u_k}(x) = \sum_{x^{[n]}:x^{[n]}_k=x} \exp\left(\frac{-1}{2\sigma_z^2}\|y_n - s^{[n]}x^{[n]}\|^2\right) \prod_{m \in V(n)\backslash k} I^{(i-1)}_{u_m \to c_n}(x^{[n]}_m) \quad (1)$$

Equation 2: Computation of outgoing message from variable node to function node $$I^{(i)}_{u_k \to c_n}(x) = \prod_{m \in Z(k)\backslash n} I^{(i)}_{c_m \to u_k}(x) \quad (2)$$

where index i denotes the corresponding iteration. $I^{(i)}_{c_n \to u_k}(x)$ represents the message vector sent from node $c_n$ to node $u_k$. Indeed this message is a function of local channel observations and the message received on previous iterations on the function node. This is a vector containing a probability distribution (or a corresponding LLR distribution) over the symbol constellation X. After a certain number of iterations, symbol decisions are made. This can be written as:

Equation 3 Symbol decision after iterations $$\hat{x}_k = \arg\max_{x \in \mathbb{X}} \prod_{m \in Z(k)} I^{(i)}_{c_m \to u_k}(x) \quad (3)$$

The complexity of the message passing algorithm can be derived by using the underlying factor graph presentation shown in FIG. 3 and related equations. In this case, the demodulator does not need to go through all the possible sequences contrary to MAP detection. Indeed, the local channel observation complexity is small as there are a small number of nodes involved for computation of local channel observation. The total number of alternatives to be searched in the local channel observation captured in Equation 1 is $N|\mathbb{X}|^{w_r-1}$. The overall complexity of evaluating Equation 1 becomes:

$$N|\mathbb{X}|^{w_r-1}(w_r-1)$$

The overall complexity of algorithm after $N_{it}$ iterations will be:

$$[N|\mathbb{X}|^{w_r-1}+K(w_c-1)]N_{it}$$

The signature matrices of the conventional LDPC structure are low density and have cycles in their graph representation, such as shown in FIG. 3.

The aspects of the disclosed embodiments provide a LDS signature matrix or structure specially tailored for iterative receivers with a simplified and non-iterative message passing LDS detector matched to the signature matrix.

As is illustrated in FIG. 2, multiple iterations in the iterative receiver apparatus 200 are performed by executing repeatedly non-iterative message passing LDS detector 202 and SISO decoder 208, exchanging the soft information between SISO decoder 208 and the LDS detector 202.

Referring to FIG. 1, the LDS signature matrices used in the transmitter apparatus 100 of the disclosed embodiments is scalable, and a cycle-free signature matrix can be designed for any arbitrary modulation order and any arbitrary overloading factor. As a consequence, the transmitter apparatus 100, or transmission system, can be easily adapted to varying channel conditions.

The aspects of the disclosed embodiments provide a joint transmitter-receiver apparatus structure that can achieve near single-user performance for overloading factors to 5 As is shown in FIG. 2, the simplified LDS detector 202 incorporating aspects of the disclosed embodiments is combined with a SISO decoder 208, and will jointly detect and decode transmitted symbols according to an iterative approach.

As noted above, the graph presentation of signatures shown in FIG. 3 includes cycles. This means that there is at least one path that starts from one node and terminates to the same node. In LDPC signatures, the length of the shortest cycle is called girth. It was anticipated that, using such a structure, a MPA-based detector will give a good approximation of the input signal after some iterations. Normally the number of iterations is chosen to be equal to or larger than the girth of the signature to permit the MPA to converge through iterations and update all the message through nodes. While good performance can be obtained for lower order modulations and lower overloading factors, when it comes to higher overloading factors, using the MAP detector with signatures of LDPC type fails to provide good approximation of estimated symbols and therefore the receiver performance is degraded. This is due to the fact that the interference term in Equation 1 above (the second term) is not correctly approximated after certain number of iterations. Therefore, when symbol decision is made (Equation 3) the symbol is rather a poor approximation of input symbols.

Figure 4:
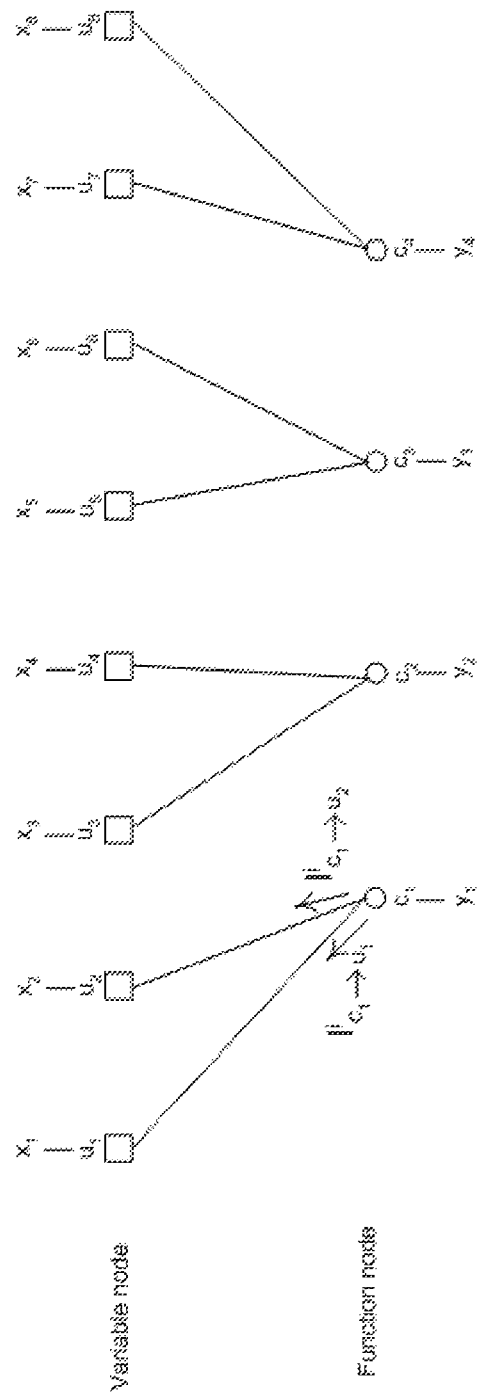
FIG. 4 illustrates a factor graph presentation for an LDS scheme incorporating aspects of the disclosed embodiments.

In order to overcome this limitation the aspects of the disclosed embodiments provide another structure for the LDS signature and reduce the complexity of LDS decoder 202. Referring to FIG. 1, at the transmitter apparatus 100 side, the old LDS signature matrix that relies on LDPC structure is replaced with a LDS signature matrix in the LDS transmitter 110 where the corresponding graph presentation has no cycles. This type of signature matrix is referred to as a cycle-free signature matrix. FIG. 4 is a graph presentation of a cycle-free signature matrix. As is illustrated in the graph of FIG. 4, and in comparison to the graph of FIG. 3, there is no path that starts from one node and terminates to the same node.

The design procedure to obtain suitable signatures for any arbitrary overloading factor $$\Omega = \frac{K}{N}$$

and any arbitrary modulation order M is as follows. When the overloading factor is an integer value, i.e. when $\Omega$ is an integer, the new cycle-free signature matrix for any overloading factor and any modulation order could be defined as:

$$S=[I_N e^{j\varphi_0^{(\Omega,M)}} I_N e^{j\varphi_1^{(\Omega,M)}} \ldots I_N e^{j\varphi_{\Omega-1}^{(\Omega,M)}}] \quad (4)$$

with $\varphi_i^{(\Omega,M)}$ being the phase rotation applied to the i-th superposed symbol in each chip. The set of phases $$\{\varphi_i^{(\Omega,M)}\}_{i=0}^{\Omega-1}$$

is obtained for a predefined overloading factor $\Omega$ and modulation order M according to certain design criteria that will be explained in the sequel. $I_N$ is the identity matrix of size N×N. To simplify notation, we will assume that the modulation order M is fixed and therefore we will drop it.

When the overloading factor is not an integer value, the initial design of equation (4) could be extended into a more general form. For instance, when $1<\Omega<2$ we can write $$\Omega = \frac{K}{N} = \frac{N+p}{N} = 1 + \frac{p}{N}$$

with p<N. For this case, the cycle-free signature matrix can be written as:

$$S = \begin{bmatrix} I_N e^{j\varphi_0^{(2)}} & \begin{array}{c} I_p e^{j\varphi_1^{(2)}} \\ 0_{(N-p)\times p} \end{array} \end{bmatrix} \quad (5)$$

with $\varphi_0^{(2)}$ and $\varphi_1^{(2)}$ being the first and second phase rotation corresponding to an overloading factor $\Omega=2$. $I_p$ denotes an identity matrix of size p×p and $0_{(N-p)\times p}$ denotes zero matrix with size (N−p)×p. Therefore, the cycle-free signature matrix is a concatenation of phase rotating identity matrices (i.e. $I_N e^{j\varphi_0^{(2)}}$ and $I_p e^{j\varphi_1^{(2)}}$) and all zero matrices (i.e. $0_{(N-p)\times p}$).

In the general case, if $\Omega$ is not integer, we can write $$\Omega = \lfloor \Omega \rfloor + \frac{p}{N} \text{ where } 0 \le p \le N$$

where $0 \le p < N$ and $\lfloor \Omega \rfloor$ denotes the nearest integer less than $\Omega$. We can extend the cycle-free signature matrix defined by equation (5) to:

$$S = \begin{bmatrix} I_N e^{j\varphi_0^{(\lfloor\Omega\rfloor+1)}} & \begin{array}{cc} I_p e^{j\varphi_1^{(\lfloor\Omega\rfloor+1)}} & 0_{p\times(N-p)} \\ 0_{(N-p)\times p} & I_{N-p} e^{j\varphi_1^{(\lfloor\Omega\rfloor)}} \end{array} & \cdots \\ & \begin{array}{cc} I_p e^{j\varphi_{\lfloor\Omega\rfloor-1}^{(\lfloor\Omega\rfloor+1)}} & 0_{p\times(N-p)} \\ 0_{(N-p)\times p} & I_{N-p} e^{j\varphi_{\lfloor\Omega\rfloor-1}^{(\lfloor\Omega\rfloor)}} \end{array} & \begin{array}{c} I_p e^{j\varphi_{\lfloor\Omega\rfloor}^{(\lfloor\Omega\rfloor+1)}} \\ 0_{(N-p)\times p} \end{array} \end{bmatrix}$$

with $\varphi_n^{(\Omega)}$ being the $n^{th}$ phase selected for overloading factor $\Omega$. It is assumed hereinafter that $\varphi_0^{(\Omega)}=0$. In the case where $\varphi_0^{(\Omega)} \ne 0$, $\varphi_n^{(\Omega)}$ being the $n^{th}$ phase is obtained taking into account the value of $\varphi_0^{(\Omega)}$.

Several methods could be used to obtain the phase values $\varphi_n^{(\Omega)}$.

In one embodiment, the phase $\varphi_n^{(\Omega)}$ is chosen in a way to maximize the minimum Euclidean distance of the resulting chip constellation after spreading. For example, consider the complex-valued input symbol constellation $\mathbb{X}$, with $$\mathbb{X}=\{x_k, k=0, \ldots, \overline{M}-1\}$$

and $|\mathbb{X}|=2^M=\overline{M}$ with M being the selected modulation order. Symbols of the chip constellation belongs to $\mathbb{X}_{ch}$, whose size is $|\mathbb{X}_{ch}|=\overline{M}^\Omega$:

$$\mathbb{X}_{ch}=\{c_l, l=0, \ldots, \overline{M}^\Omega-1\}$$

Symbols $c_l$ of $\mathbb{X}_{ch}$ can be written as:

$$c_l = \sum_{i=0}^{\Omega-1} e^{j\varphi_i^{(\Omega)}} x_{\lfloor \frac{l}{\overline{M}^i} \rfloor \bmod \overline{M}}$$

Here, $x_k \in \mathbb{X}$ denotes the unit energy input symbols. The objective is to determine the values of phases $\{\varphi_i^{(\Omega)}\}_{i=1}^{\Omega-1}$ that result in the largest minimum Euclidean distance of $\mathbb{X}_{ch}$.

If we define the squared Euclidean distance between two distinct chips as:

$$d_{l,l'}^2(\varphi_1^{(\Omega)}, \ldots, \varphi_{\Omega-1}^{(\Omega)}) = \|c_l - c_{l'}\|^2$$

Then the minimum squared Euclidean distance could be written as:

$$d_{min}^2(\overline{\varphi}) = \min_{\substack{l,l' \in \{0, \ldots, \overline{M}^\Omega-1\} \\ l \ne l'}} d_{l,l'}^2(\overline{\varphi})$$

where $\varphi = (\varphi_1^{(\Omega)}, \ldots, \varphi_{\Omega-1}^{(\Omega)})$.

The optimal value of $\overline{\varphi}$ is obtained analytically or computationally as:

$$\varphi_{opt}^{(\Omega)} = \text{argmax}_{\overline{\varphi} \in [0, 2\pi]^{\Omega-1}} (d_{min}^2 \overline{\varphi}^{(\Omega)}).$$

In some cases, the maximization of the minimum Euclidean distance might not be the best criterion. In another embodiment we select the phases $\varphi_i^{(\Omega)}$ as uniformly distributed over the region $[0, \Theta)$ where $\Theta$ is the minimum positive phase rotation that transforms the signal constellation $\mathbb{X}$ into itself. By transforming the signal constellation $\mathbb{X}$ into itself we mean the same set of signals in the constellation are obtained after rotation.

For example, for QAM we have $\Theta = \pi/2$ and therefore we obtain $$\varphi_i^{(\Omega)} = e^{j\left(\frac{\pi}{2i}\right)} \text{ for } i = 1, \ldots, \Omega-1.$$

Any of the above described embodiments related to the computation of $\overline{\varphi}_{opt}^{(\Omega)}$ can be straightforwardly applied to the case where the multiplexed users employ different modulations.

Example of the new spreading code according to the aspects of the disclosed embodiments:

For example for the case of overloading factor $\Omega=2$ and number of chips N=12, matrix S in equation (2) is of size 12×24. This could be written as:

$$S = [I_{12} e^{j\varphi_0^{(2)}} \; I_{12} e^{j\varphi_1^{(2)}}]$$

With $\varphi_0^{(2)} = 0$ and $$\varphi_0^{(2)} = 0 \text{ and } \varphi_1^{(2)} = \frac{\pi}{6}.$$

this corresponds to the phase values maximizing the minimum Euclidean distance of the resulted chip constellation when QPSK modulation with overloading factor 2 is used.

Therefore it becomes clear that the cycle-free signature matrix is a concatenation of phase rotating identity matrices and all-zero matrices.

It is also noted that the arbitrary modulation order and arbitrary overloading factor refers to any modulation order or any overloading factor. The overloading factor can be any value greater than one. It is assumed that conventional modulations is used in wireless communications i.e. BPSK, QPSK, 16 QAM, 64 QAM and 256 QAM corresponding to modulation orders 1, 2, 4, 6 and 8.

Complexity Analysis of the LDS Detector 202:

The LDS signature structure of the disclosed embodiments provides the cycle-free signature matrix described herein. As noted above and illustrated in the graph of FIG. 4, there is no path that starts from one node and terminates to the same node. The exemplary graph representation in FIG. 4 is for a proposed cycle-free signature matrix with the integer overloading factor of equation (2) and a signature of size 4×8.

When applying the message passing algorithm to the signature structure of the disclosed embodiments, it becomes clear that it is not necessary to compute the outgoing message from variable node to function node, because the exact soft information (or probability distribution) of variable nodes is obtained already after the first half iteration. Therefore, the exact variable node soft values are obtained and the resulted MPA detector will give the exact MAP detection of the transmitted symbol.

Based on the aforementioned analysis, it is illustrated that the complexity of the LDS detector 202 of the disclosed embodiments is considerably reduced. The complexity is approximately $N|\mathbb{X}|^{w_r-1}$.

Figure 5:
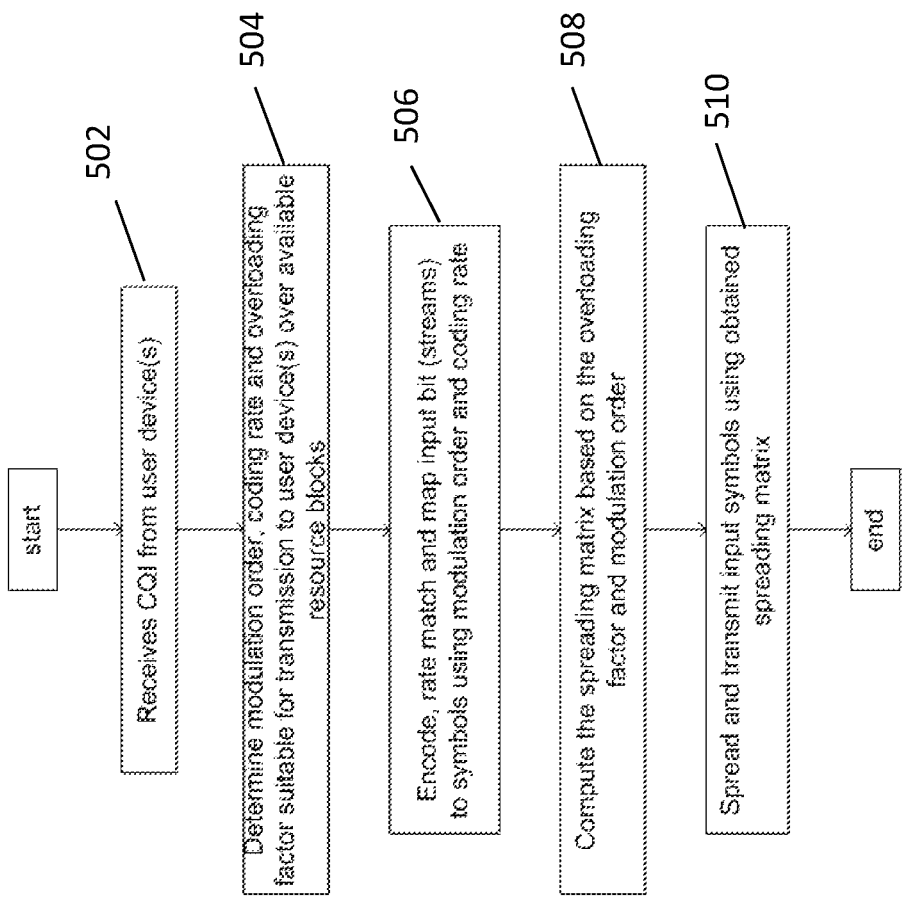
FIG. 5 illustrates a flowchart of a transmission process incorporating aspects of the disclosed embodiments.

FIG. 5 illustrates one embodiment of a transmission procedure used in a network node, such as a transmitter apparatus 100. In one embodiment, selects at least one data message for transmission. This can include the transmitter apparatus 100 receiving 502 channel quality indicator (CQI) data from user device(s). A modulation order, coding rate and overloading factor suitable for transmission to user device(s) over available resource blocks is determined 504. The input bit stream(s) are encoded, rate matched and mapped 506 to modulation symbols using the modulation order and coding rate. The spreading matrix is computed 508 based on the overloading factor and modulation order. The input symbols are spread and transmitted 510 using the obtained spreading matrix.

Figure 6:
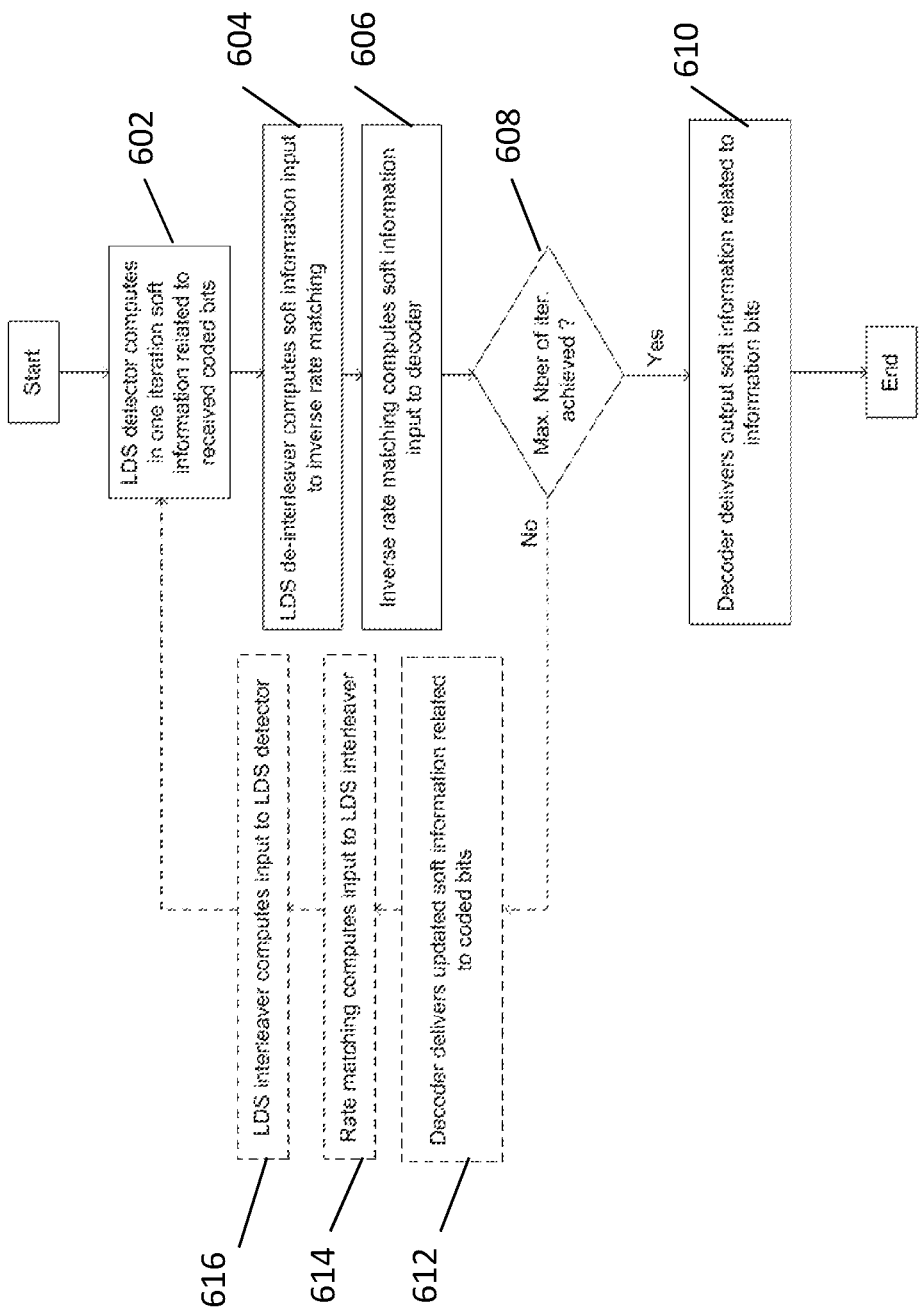
FIG. 6 illustrates a flowchart of a reception process incorporating aspects of the disclosed embodiments.

FIG. 6 illustrates an exemplary flow chart of the reception procedure in a user device, such as the receiver apparatus 200, incorporating aspects of the disclosed embodiments. In one embodiment, the receiver apparatus receives the transmission signal and the LDS detector 202 computes 602 in one iteration, the soft information related to received coded bits of a transmitted message that is received. The LDS de-interleaver 204 computes 604 soft information input to inverse rate matching 206. The inverse rate matching 206 computes 606 the soft information input to the decoder 208. It is determined 608 whether the maximum number of iterations has been achieved. If yes, the decoder 208 delivers 610 the output soft information related to the information bits.

If the maximum number of iterations has not been achieved, the decoder 208 delivers 612 the updated soft information related to coded bits. The rate matching 210 computes 614 the input to the LDS interleaver 212. The LDS interleaver 212 computes the input to the LDS detector 616.

Results of Performance Evaluation:

To evaluate and compare the spectral efficiency of the cycle-free signature matrix structure of the disclosed embodiments, a comparison is carried out in term of Spectral Efficiency (SE). This can be defined as:

$$SE = \Omega MR(1-BLER)$$

where BLER is the block error rate. The BLER is estimated through Monte Carlo simulation for a range of SNR values. The SNR herein adopted is the ratio $E_b/N_0$ of the information bit energy to noise energy, where $N_0 = 2\sigma_z^2$ is the two-sided power spectral efficiency of noise.

Concerning the channel coding schemes, two schemes specified in the LTE standard were considered. The first scheme consists of a 64-state feed-forward binary convolutional code with rate ⅓ and free distance $d_f=15$. It is encoded using a constraint-length 7 encoder with generators [133, 171, 165]$_8$. The code trellis is terminated using a tail-biting technique. The second scheme is a parallel concatenated convolutional code (a.k.a. turbo code) consisting of two 8-state recursive systematic encoders connected through an interleaver. The structure of this encoder conforms to the LTE standard.

The increased SE of the overloaded schemes is achieved at the expense of an increased transmitted power. This increase can be characterized by the single-stream SNR loss, a feature that is defined as:

$$\Delta_{SNR}(\Omega,\rho) = SNR(SE(\Omega) = \rho SE_\infty(\Omega)) - SNR(SE(1) = \rho SE_\infty(1)).$$

where $\Omega$ indicates, in this case, the overloading factor, and $$SE_\infty(\Omega) = \lim_{SNR \to \infty} SE(\Omega)$$

the asymptotic aggregate spectral efficiency (ASE).

Figure 7:
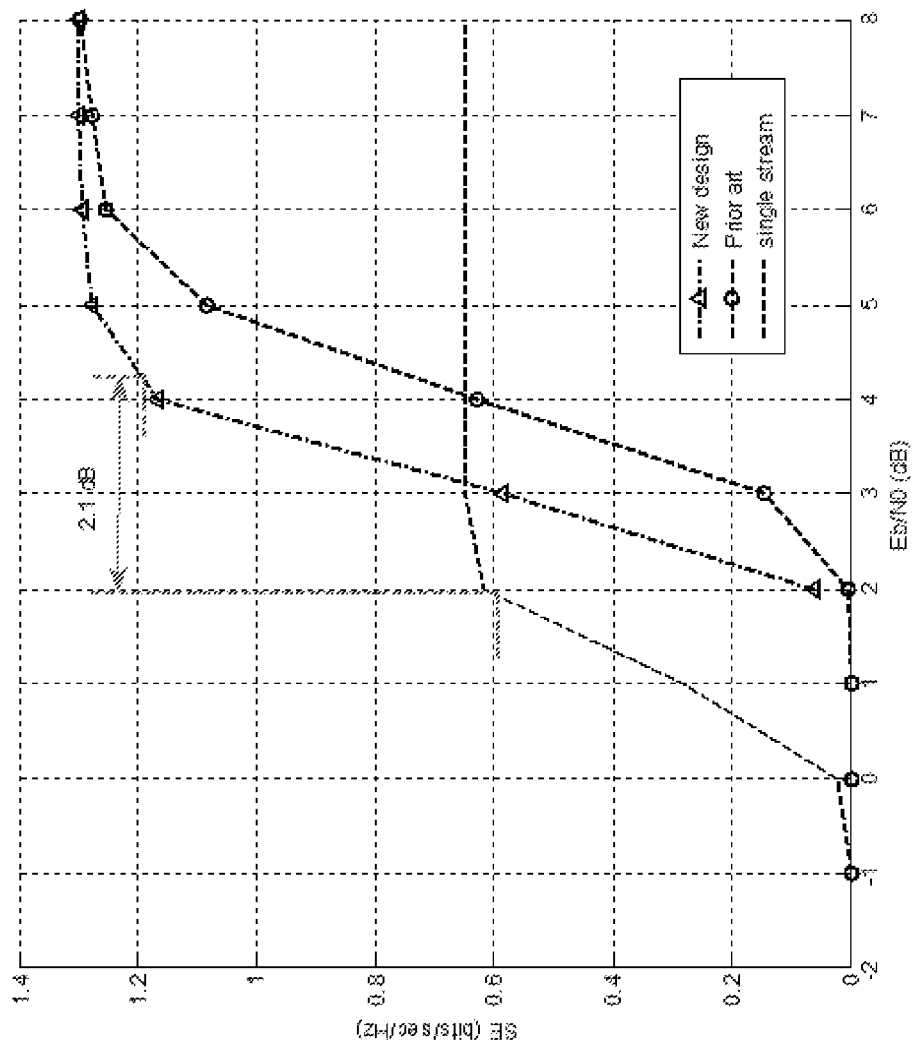
FIG. 7 illustrates a spectral efficiency graph comparison of prior art LDS schemes versus an LDS scheme incorporating aspects of the disclosed embodiments.

FIG. 7 shows the spectral efficiency obtained by the cycle-free signature matrix design of the disclosed embodiments compared to the old design in the case of a turbo code with mother code rate (0.33) and a signature matrix with overloading factor of 2.

In these simulations, we perform the transmission of an information word of L bits on 240 time-frequency resource elements. Coded bits are modulated using QPSK. Thus, taking into account the overloading factor $\Omega=2$, we obtain a code word length of 960 coded bits.

The signature matrix used for prior art has size 12×24 and LDPC structure, t and contains cycles. The non-zero elements of the signature matrix are selected according to J. van de Beek and B. Popovic, "Multiple access with low-density signatures," in proceedings of *IEEE global Telecomm. Conf. GLOBECOM* 2009, Honolulu, Hi., November 30-December 4, pp 1-6. The signature used for the new cycle-free signature matrix scheme of the disclosed embodiments with overloading factor 2 is a concatenation of two 12×12 identity matrices. The second identity matrix has phase coefficients equal to $e^{j\pi/6}$. This phase shift corresponds to the rotation that maximizes the minimum Euclidean distance between QPSK symbols of the chip constellation for the overloading factor of 2, as described previously.

In the evaluations, the iterative receiver of LDS detector 202 performs 12 outer iterations and 2 inner LDS iterations and 2 turbo code iterations, while with the cycle-free signature matrix design of the disclosed embodiments, the iterative receiver apparatus 200 performs 12 outer iterations and one LDS iteration with 2 turbo code iterations.

It is shown that the cycle-free signature matrix design of the disclosed embodiments performs better than an LDS design (1 dB improvement) for spectral efficiency of 1 bits/s/Hz with a single-stream SNR loss reduced to 2.1 dB.

Figure 8:
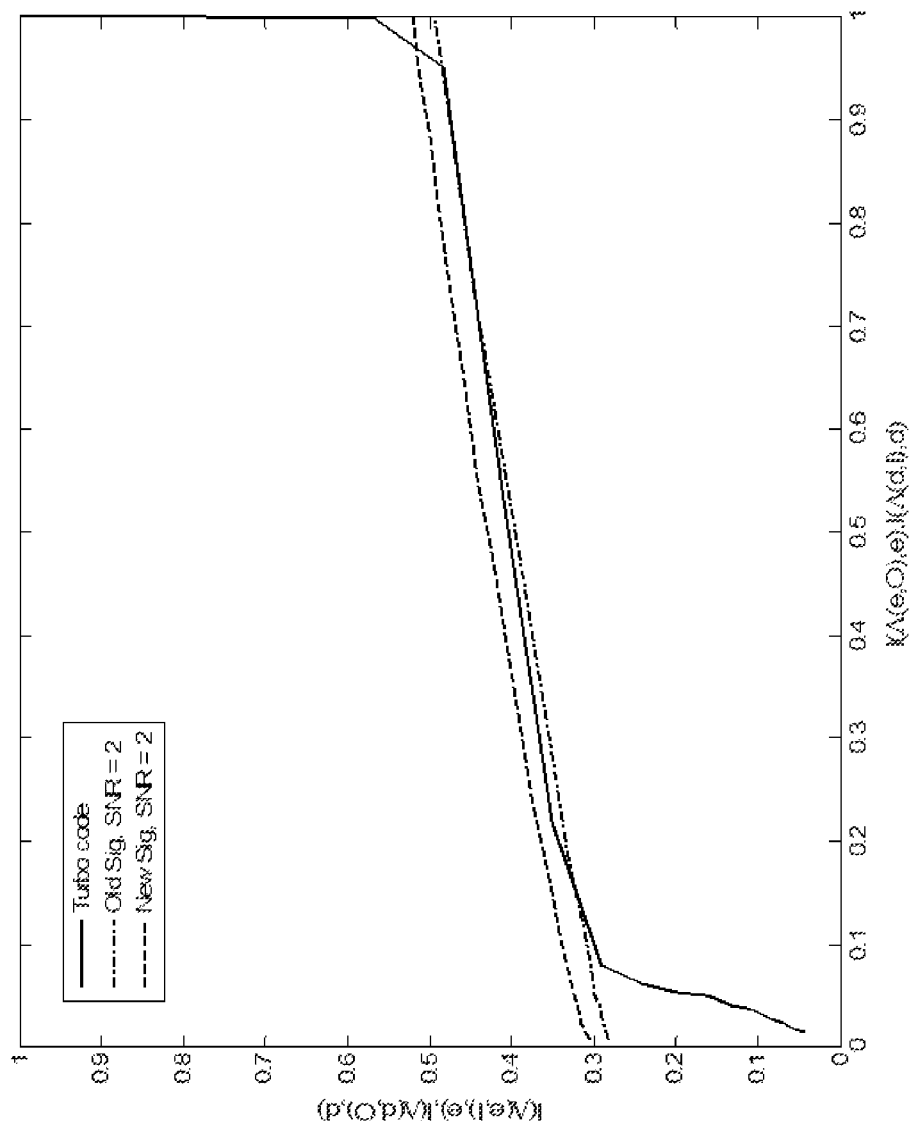
FIG. 8 is an EXIT chart comparison of prior art LDS schemes versus an LDS scheme incorporating aspects of the disclosed embodiments.
Figure 9:
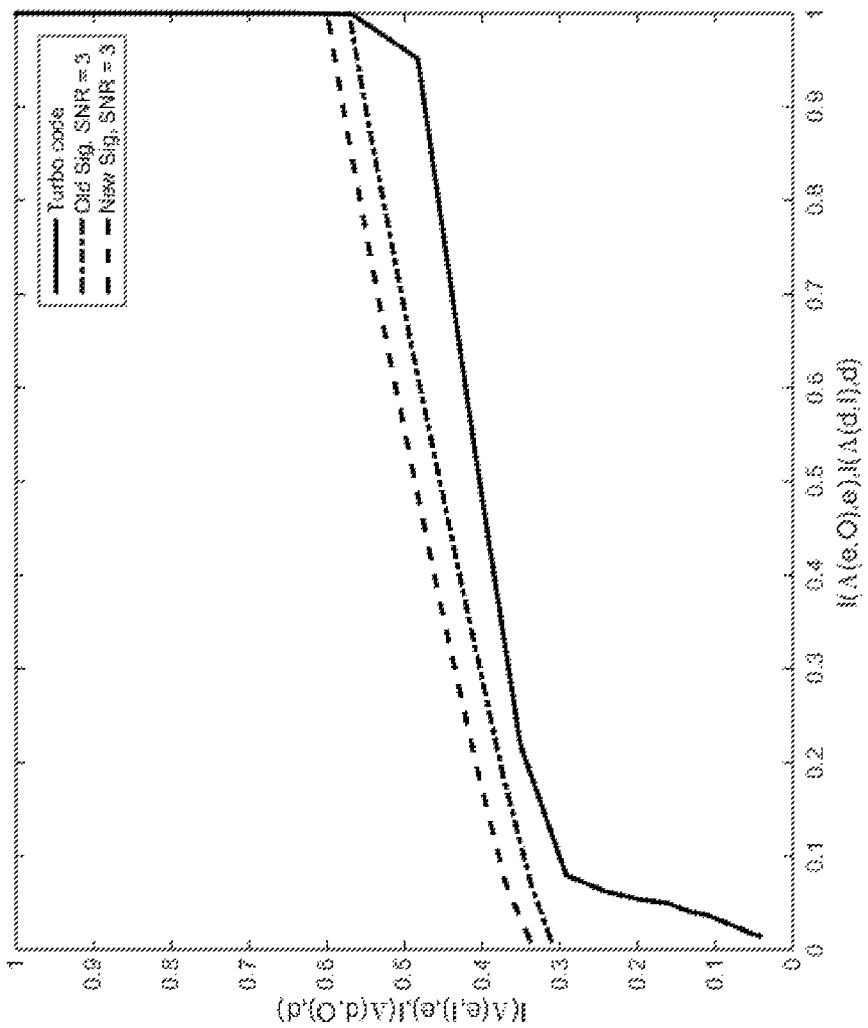
FIG. 9 illustrates another an EXIT chart comparison of prior art LDS schemes versus an LDS scheme incorporating aspects of the disclosed embodiments.

FIGS. 8 and 9 illustrate EXIT charts that can be used to gain insight into the behavior of the cycle-free signature matrix of the disclosed embodiments. EXIT charts are useful tools to analyze the information transfer between two components of a decoder with iterations. In the analysis described herein, the information transfer between LDS detector 202 and soft decoder 208 is studied, which in one embodiment comprises a Turbo decoder. FIG. 8 shows the EXIT chart for $E_b/N_0=2$ dB for the turbo code with mother code rate.

The transfer characteristic of soft decoder or turbo code 208 and LDS detector 202 are shown independently. The transfer characteristic of LDS detector 202 is shown for the new cycle-free signature matrix and the prior art. As is shown in this figure, the curve related to the old signature and turbo code intersect in low mutual information level which results a high BER. This result is in-line with the spectral efficiency figure (FIG. 7) where for $E_b/N_0=2$ dB the spectral efficiency is zero.

For the same $E_b/N_0$ value the EXIT curve for the cycle-free signature matrix of the disclosed embodiments there is no intersection at all. This is in-line with the spectral efficiency curve where for $E_b/N_0=2$ dB the spectral efficiency is not zero.

FIG. 9 shows the EXIT chart for $E_b/N_0=3$ dB. There is no intersection in this figure between the transfer characteristics, therefore the receiver converges through iterations to a high value of mutual information. It is noticeable that for the case of new cycle-free signature matrix of the disclosed embodiments, there is a vertical shift of the LDS curve to the higher value of mutual information that implies higher convergence properties. This is also in-line with the results obtained from FIG. 6. Indeed, in the example of FIG. 9, for $E_b/N_0=3$ dB the new cycle-free signature matrix of the disclosed embodiments achieves higher spectral efficiency.

The aspects of the disclosed embodiments provide for obtaining single stream SNR loss even for higher overloading factors. For different overloading factors we have chosen different phase coefficient designs depending on the achieved spectral efficiency as summarized in Table 1:

TABLE 1

Phase coefficients designs for different overloading factors.

| | |
|---|---|
| $\Omega = 2$ | Max. Euclidean distance |
| $\Omega = 3$ | Max. Euclidean distance |
| $\Omega = 4$ | Uniform phase |
| $\Omega = 5$ | Uniform phase |

Table 2 summarizes the results obtained for convolutional codes and different coding rates and different overloading factors ($\Omega=2$, 3, 4 and 5).

TABLE 2

Single-stream SNR loss for convolutionally coded system with new design.

| Overall coding rate | 0.1 | 0.33 | 0.5 |
|---|---|---|---|
| $\Omega = 2$ | 0.5 dB | 1 dB | 2.5 dB |
| $\Omega = 3$ | 0.7 dB | 4.2 dB | 6.7 dB |
| $\Omega = 4$ | | 9 dB | 9.5 dB |
| $\Omega = 5$ | | 14 dB | 19 dB |

Table 2 illustrates the single-stream SNR loss obtained with the cycle-free signature matrix design of the disclosed embodiments with turbo-code with very low rates (0.1), mother code rate (0.33) and high rates (0.5). Single-stream SNR loss compared to the non-overloaded (single stream case) for the cycle-free signature matrix of the disclosed embodiments and considered coding rates are summarized in Table 3.

TABLE 3

Single-stream SNR loss for turbo-coded system with new design.

| Overall coding rate | 0.1 | 0.33 | 0.5 |
|---|---|---|---|
| $\Omega = 2$ | 1 dB | 2.1 dB | 4 dB |
| $\Omega = 3$ | 1.2 dB | 7 dB | 8 dB |
| $\Omega = 4$ | | 9 dB | 12.5 dB |
| $\Omega = 5$ | | 15 dB | 16 dB |

The tables above illustrate that the single-stream SNR loss grows almost linearly when the overloading factor is increased for turbo code, when the coding rate is equal to 0.5. For other rates and other channel codes, SNR loss is not growing linearly, but an acceptable value of single-stream SNR loss is obtained.

Figure 10:
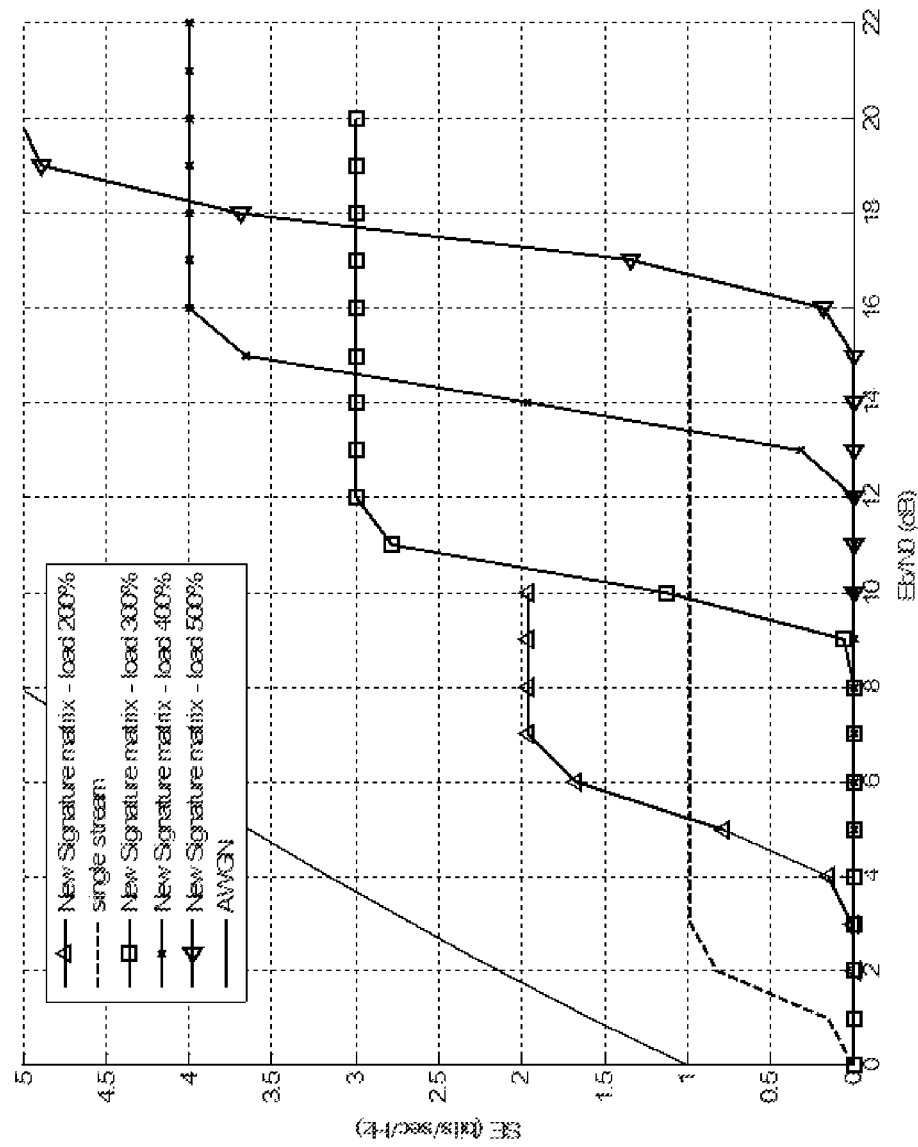
FIG. 10 is a spectral efficiency graph of an LDS scheme incorporating aspects of the disclosed embodiments.

FIG. 10 shows single stream SNR loss for the case of a turbo code and coding rate 0.5, and different overloading factors up to 5.

Figure 11:
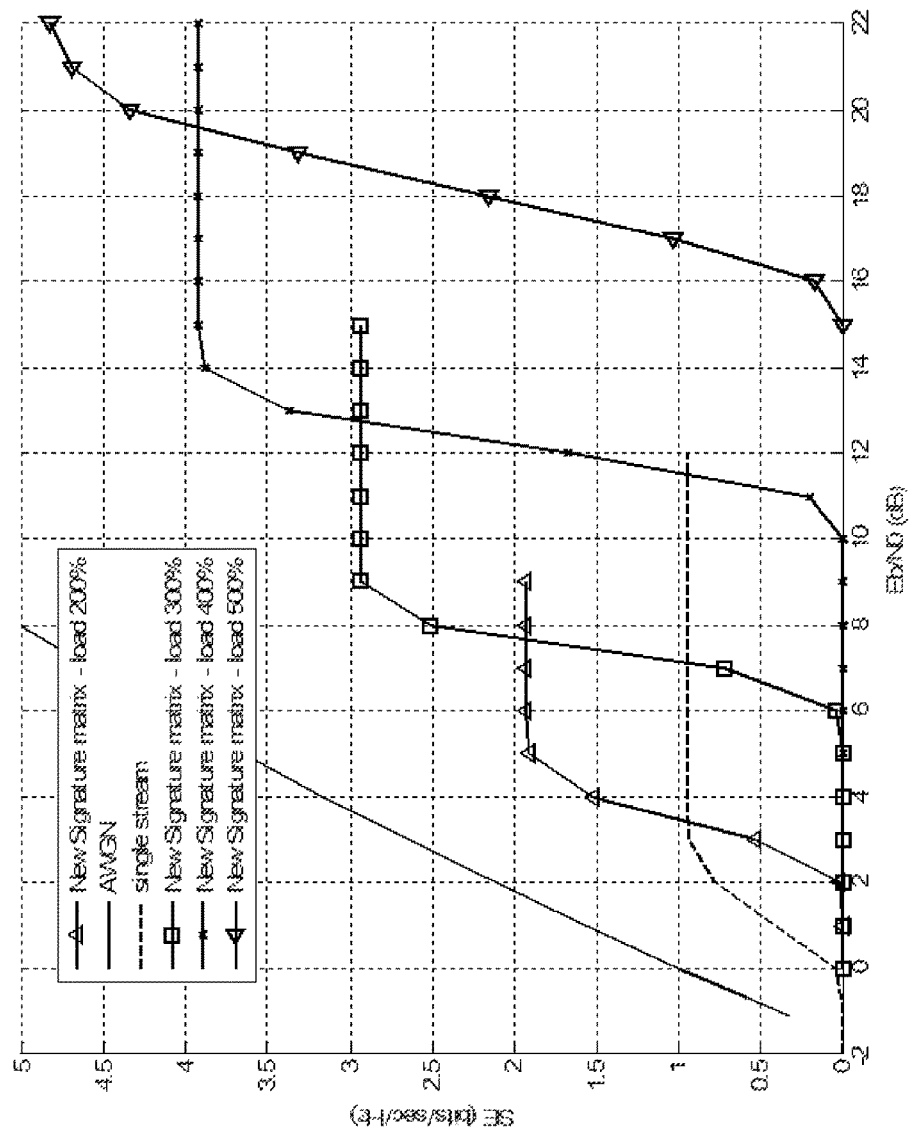
FIG. 11 is another spectral efficiency graph of an LDS scheme incorporating aspects of the disclosed embodiments.

FIG. 11 shows the single stream SNR loss for the case of rate 0.5 convolutional code and different overloading factors up to 5.

Results show that the joint transmitter-receiver structure of the disclosed embodiments can achieve a robust near single user performance for overloading factors to 5 when this simplified LDS detector 202 is combined with a SISO decoder 208 to jointly detect and decode transmitted symbols according to an iterative approach.

The aspects of the disclosed embodiments enhance the previously designed signature matrix for the LDS system.

The cycle-free signature matrix of the disclosed embodiments performs better compared to the prior art and has less complexity.

All the LDS designs proposed so far use signature matrices based on the LDPC structure that contains cycles. These signature matrices do not perform well for high overloading factors and modulation order higher than BPSK. The new LDS signature structure of the disclosed embodiments is a cycle-free signature matrix, thereby improving the performance of the system and reducing the complexity of the receiver.

Figure 12:
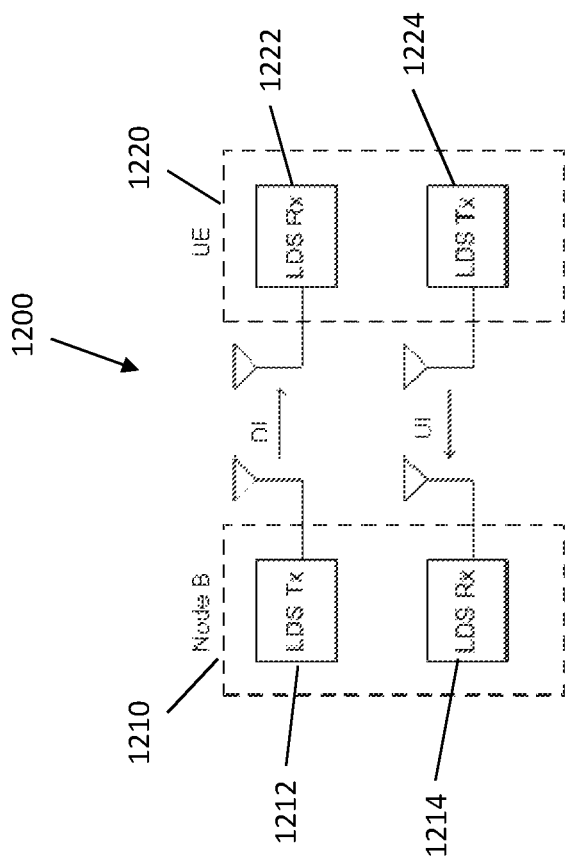
FIG. 12 illustrates an exemplary apparatus incorporating aspects of the disclosed embodiments.

FIG. 12 illustrates an exemplary apparatus 1200 incorporating aspects of the disclosed embodiments. In this example, the transmitter apparatus 100 of FIG. 1 and the receiver apparatus 200 of FIG. 2 are in the same device or apparatus 1200, which in one embodiment can include a radio access network device or apparatus. The apparatus 1200 in this example comprises a NodeB 1210 and a User Equipment (UE) 1220. In alternate embodiments, the apparatus 1200 can include any suitable devices and components for implementing the aspects of the disclosed embodiments as is described herein.

For downlink communication (DL), information is transferred from LDS Tx (NodeB) 1212 to LDS Rx (UE) 1222. For uplink communication (UL) information is transferred from LDS TX (UE) 1224 to LDS Rx (NodeB) 1214. The apparatus 1200 can embody an environment where the same antennas are used in NodeB 1210 for both transmission and reception.

Figure 13:
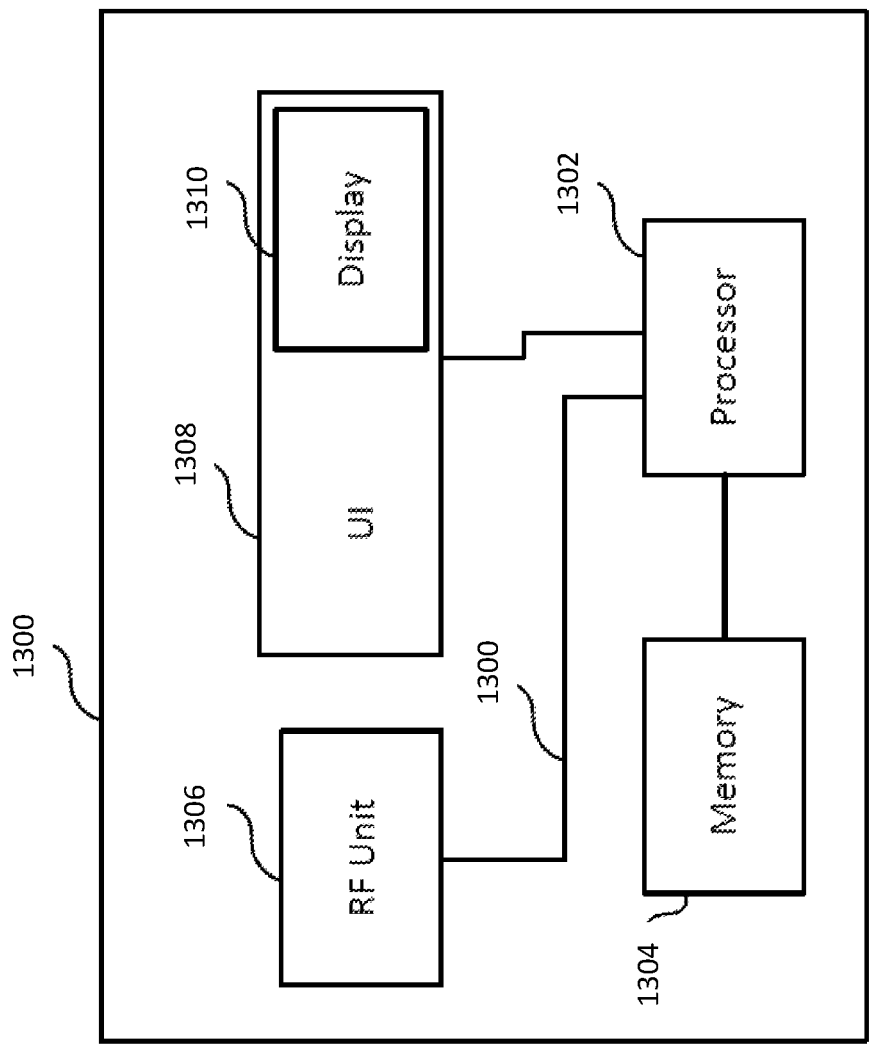
FIG. 13 is a block diagram of an exemplary apparatus that can be used to practice aspects of the disclosed embodiments.

FIG. 13 illustrates a block diagram of a wireless device 1300 incorporating aspects of the present disclosure. The wireless device 1300 is appropriate for implementing embodiments of the orthogonal transmission apparatus and methods described herein. The illustrated wireless device 1300 includes a processor 1302 coupled to a memory 1304, a radio frequency (RF) unit 1306, a user interface (UI) 1308, and a display 1310. The apparatus 1300 may be a mobile device such as any of various types of wireless communications user equipment including cell phones, smart phones, or tablet devices. Alternatively, the apparatus 1300 may also be used as a transmitter such as in a base station. It may be desirable when using the apparatus 1300 as a base station to remove the UI 1308 and administer the apparatus 1300 remotely via a network or other type of computer interface (not shown).

The processor 1302 may be a single processing device or may comprise a plurality of processing devices including special purpose devices, such as for example digital signal processing (DSP) devices, microprocessors, or other specialized processing devices as well as one or more general purpose computer processors including parallel processors or multi-core processors. The processor 1302 is configured to perform embodiments of the processes described herein. The processor 1302 is coupled to a memory 1304 which may be a combination of various types of volatile and/or non-volatile computer memory such as for example read only memory (ROM), random access memory (RAM), magnetic or optical disk, or other types of computer memory. The memory 1304 stores computer program instructions that may be accessed and executed by the processor 1302 to cause the processor 1302 to perform a variety of desirable computer implemented processes or methods as are described herein. The program instructions stored in memory 1304 may be organized as groups or sets of program instructions referred to by those skilled in the art with various terms such as programs, software components, software modules, units, etc., where each program may be of a recognized type such as an operating system, an application, a device driver, or other conventionally recognized type of software component. Also included in the memory 1304 are program data and data files which may be accessed, stored, and processed by the computer program instructions.

The RF Unit 1306 is coupled to the processor 1302 and configured to transmit and receive RF signals based on digital data 1312 exchanged with the processor 1302. The RF Unit 1306 is configured to transmit and receive radio signals that may conform to one or more of the wireless communication standards in use today, such as for example LTE, LTE-A, Wi-fi, or may be configured for future radio access techniques. The RF Unit 1306 may receive radio signals from one or more antennas, down-convert the received RF signal, perform appropriate filtering and other signal conditioning operations, then convert the resulting baseband signal to a digital signal by sampling with an analog to digital converter. The digitized baseband signal also referred to herein as a digital communication signal is then sent 1312 to the processor 1302. In transmitter applications, the RF Unit 1306 is configured to receive digital information in the form of digital data 1312 from the processor 1302 and transmit it to one or more receivers such as mobile devices or UE.

The UI 1308 may include one or more user interface elements such as a touch screen, keypad, buttons, voice command processor, as well as other elements adapted for exchanging information with a user. The UI 1308 may also include a display unit 1310 configured to display a variety of information appropriate for a mobile device or UE 1300 and may be implemented using any desirable display type such as for example organic light emitting diodes (OLED), liquid crystal display (LCD), as well as less complex elements such as LEDs or indicator lamps, etc. In certain embodiments the display unit 1310 incorporates a touch screen for receiving information from the user of the wireless device 1300. Alternatively, when exchanging information directly with a user or operator is not required the UI 1308 may be replaced with a more desirable interface methodology, such as a network interface or other remote access technology, or removed completely.

Thus, while there have been shown, described and pointed out, fundamental novel features of the disclosure as applied to the exemplary embodiments thereof, it will be understood that various omissions, substitutions and changes in the form and details of devices and methods illustrated, and in their operation, may be made by those skilled in the art without departing from the spirit and scope of the disclosure. Further, it is expressly intended that all combinations of those elements, which perform substantially the same function in substantially the same way to achieve the same results, are within the scope of the disclosure. Moreover, it should be recognized that structures and/or elements shown and/or described in connection with any disclosed form or embodiment of the disclosure may be incorporated in any other disclosed or described or suggested form or embodiment as a general matter of design choice. It is the intention, therefore, to be limited only as indicated by the scope of the claims appended hereto.

What is claimed is:

1. A transmitter apparatus for a wireless communication system, the transmitter apparatus comprising a processor configured to:
　　receive at least one modulated data message; and
　　spread the at least one modulated data message into a transmission signal using a low density signature matrix, wherein the low density signature matrix is a cycle-free signature matrix having no cycles.

2. The transmitter apparatus of claim 1, wherein the processor is configured to spread the at least one modulated data message with at least one other modulated data message.

3. The transmitter apparatus of claim 1, wherein the cycle-free signature matrix is a concatenation of phase-rotating identity matrices and all-zero matrices.

4. The transmitter apparatus of claim 3, wherein the phase-rotating identity matrices maximize a minimum Euclidean distance between symbols of a chip constellation.

5. The transmitter apparatus of claim 3, wherein the phase-rotating identity matrices include uniformly spaced phases in a given interval $[0,k\pi]$, where $k\pi$ is a phase rotation that, when applied to a signal constellation, transforms the signal constellation into itself.

6. The transmitter apparatus of claim 1, wherein the processor is configured to spread and transmit modulation symbols for the at least one modulated data message using the cycle-free signature matrix.

7. The transmitter apparatus of claim 1, wherein the processor is configured to compute the cycle-free signature matrix based on an overloading factor of greater than one.

8. A receiver apparatus for a wireless communication system, the receiver apparatus including a processor configured to:
   receive a transmission signal; and
   detect within the received transmission signal at least one modulated data message, the processor being configured to detect the at least one modulated data message in one iteration using a cycle-free signature matrix having no cycles.

9. The receiver apparatus of claim 8, wherein the processor is configured to compute, in one iteration, soft information related to received code bits of the received transmission signal and de-interleave the soft information.

10. The receiver apparatus of claim 9, wherein the processor is configured to detect and decode the received transmission signal in a sequential manner using de-interleaving and de-rate matching.

11. The receiver apparatus according to claim 9, wherein the processor is configured to jointly detect and decode the received transmission signal through iterations including de-interleaving, de-rate matching, interleaving and rate matching.

12. A radio access network comprising a transmitter apparatus for a wireless communication system, the transmitter apparatus comprising:
   a processor configured to:
      receive at least one modulated data message; and
      spread the at least one modulated data message into a transmission signal using a low density signature matrix, wherein the low density signature matrix is a cycle-free signature matrix having no cycles;
   a receiver apparatus including a processor configured to:
      receive a transmission signal; and
      detect within the received transmission signal the at least one modulated data message, the processor being configured to detect the at least one modulated data message in one iteration using a cycle-free signature matrix having no cycles.

13. A method for non-orthogonal transmission in a wireless communication system, the method comprising:
   selecting at least one data message for transmission;
   encoding and modulating the at least one data message;
   interleaving the encoded and modulated at least one data message; and
   spreading the encoded, modulated, and interleaved at least one data message into a transmission signal using a cycle-free signature matrix having no cycles.

14. The method of claim 13, further comprising:
   receiving the transmission signal; and
   detecting within the received transmission signal at least one modulated data message in one iteration using a cycle-free signature matrix.

15. A method for non-orthogonal reception in a wireless communication system, the method comprising:
   receiving at least one modulated data message in a signal; and
   detecting, in one iteration using a cycle-free signature matrix having no cycles, at least one modulated data message in the received signal.

* * * * *